United States Patent [19]
Mack et al.

[11] Patent Number: 6,142,102
[45] Date of Patent: Nov. 7, 2000

[54] REMOTE CONTROLLED BOAR GUIDANCE SYSTEM AND METHOD OF ARTIFICIALLY INSEMINATING SOWS

[75] Inventors: Jerome Mack, 10858 365th Ave., Leola, S. Dak. 57450; Joseph St. Aubin, Brookings; Nickolas E. Kleinjan, Bruce, both of S. Dak.; Jonathan Roehrl, Redwood Falls, Minn.

[73] Assignee: Jerome Mack, Leola, S. Dak.

[21] Appl. No.: 09/410,325

[22] Filed: Oct. 1, 1999

[51] Int. Cl.$^7$ ..................................................... A01K 29/00
[52] U.S. Cl. ................................................................ 119/720
[58] Field of Search ..................... 119/174, 720, 119/905

[56] References Cited

U.S. PATENT DOCUMENTS 4,662,854  5/1987  Fang ........................................ 446/175
5,524,326  6/1996  Markowitz .............................. 119/707
5,568,926  10/1996 Kaptein .................................. 273/359

*Primary Examiner*—Thomas Price
*Attorney, Agent, or Firm*—Kaardal & Associates, PC

[57] ABSTRACT

A remote controlled boar guidance system and method of artificially inseminating sows for facilitating movement of a boar inside a swine insemination facility to permit safe and efficient insemination of sows by a single person. The remote controlled boar guidance system and method of artificially inseminating sows includes a remote controlled steerable vehicle having sufficient power to move a boar within confined spaces inside a swine insemination facility. The vehicle includes a plurality of wheels distributed on opposite sides of the vehicle. Wheels on each side are separately powered to permit steering of the device. The power source, drive motors, and receiver are positioned within a housing. In an embodiment, an opaque protection screen is provided to permit safe release of the boar from the device.

17 Claims, 3 Drawing Sheets

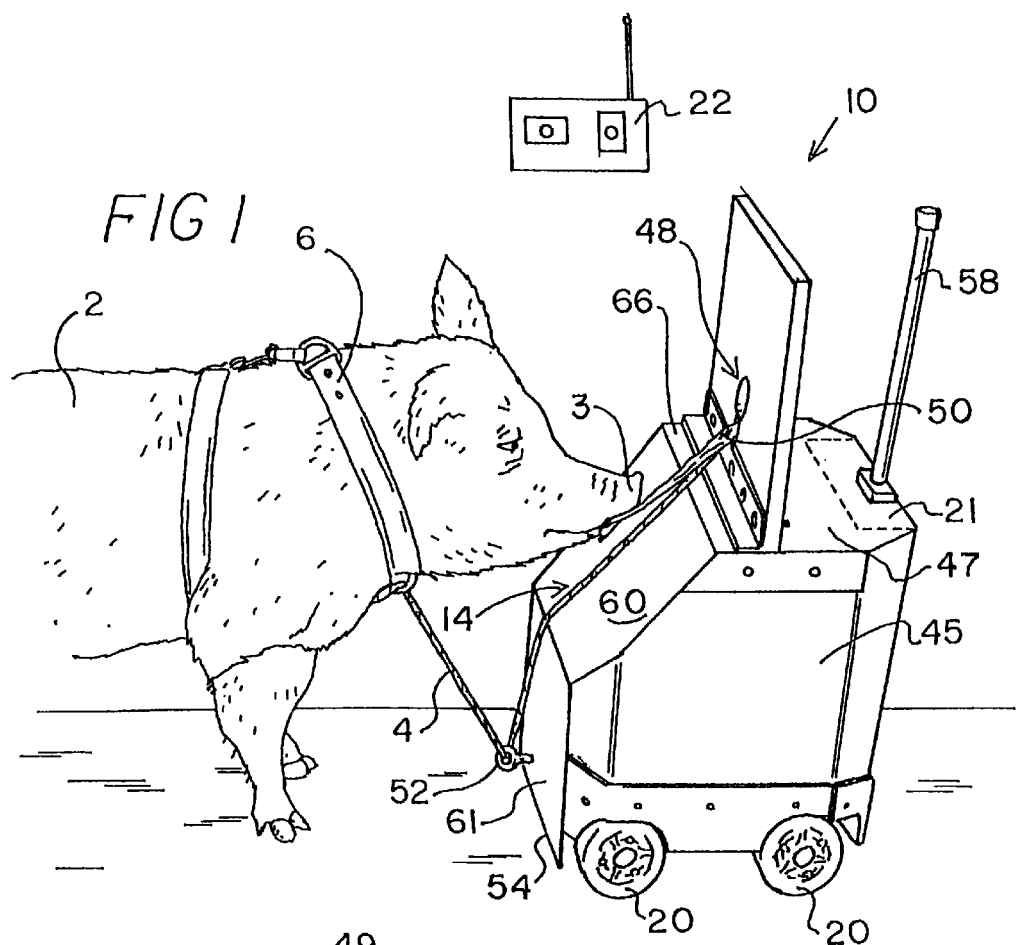
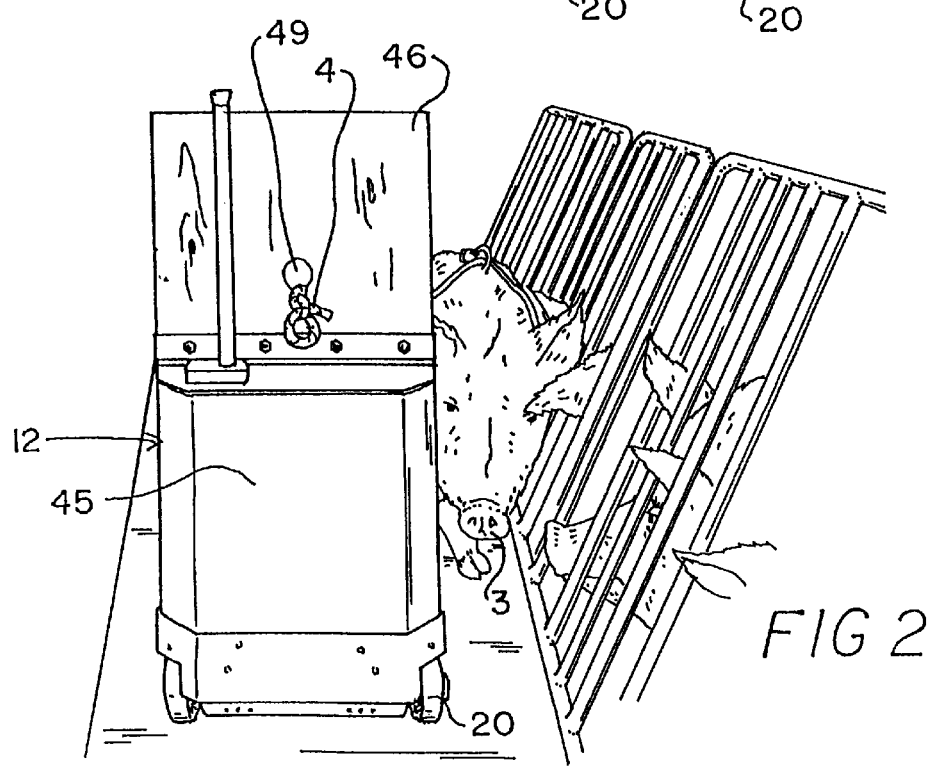

REMOTE CONTROLLED BOAR GUIDANCE SYSTEM AND METHOD OF ARTIFICIALLY INSEMINATING SOWS

BACKGROUND OF THE INVENTION

1. Field of the Invention

The present invention relates to remote controlled moving devices and more particularly pertains to a new remote controlled boar guidance system and method of artificially inseminating sows for facilitating movement of a boar inside a swine insemination facility to permit safe and efficient insemination of sows by a single person.

2. Description of the Prior Art

The use of remote controlled moving devices is known in the prior art. More specifically, remote controlled moving devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,457,263; 4,449,481; 5,082,074; 3,773,018; 4,656,967; 5,180,023; 3,976,151; 5,816,352; Des. 328,377; and 5,305,712.

While these devices fulfill their respective, particular objectives and requirements, the aforementioned patents do not disclose a new remote controlled boar guidance system and method of artificially inseminating sows.

In particular, when inseminating swine, it is common practice and necessary to place a boar within view of the sow being inseminated. Commonly, a person or persons manually steer the boar through the enclosed spaces and aisles found between pens holding the sows. Because the boar requires constant attention and careful handling, another person is required to actually execute the artificial insemination of the sows. Thus the common practice takes multiple persons and a significant amount of time and risk. As boars are commonly very heavy, very strong, very powerful and easily agitated, there is significant risk of personal injury to the person or persons maneuvering the boar. To address these problems, the inventive device includes a remote controlled steerable vehicle having sufficient power to move a boar within confined spaces inside a swine insemination facility. The vehicle includes a plurality of wheels distributed on opposite sides of the vehicle. Wheels on each side are separately powered to permit steering of the device. The power source, drive motors, and receiver are positioned within a housing. In an embodiment, an opaque protection screen is provided to permit safe release of the boar from the device.

In these respects, the remote controlled boar guidance system and method of artificially inseminating sows according to the present invention substantially departs from the conventional concepts and designs of the prior art, and in so doing provides an apparatus primarily developed for the purpose of facilitating movement of a boar inside a swine insemination facility to permit safe and efficient insemination of sows by a single person.

SUMMARY OF THE INVENTION

In view of the foregoing disadvantages inherent in the known types of remote controlled moving devices now present in the prior art, the present invention provides a new remote controlled boar guidance system and method of artificially inseminating sows construction wherein the same can be utilized for facilitating movement of a boar inside a swine insemination facility to permit safe and efficient insemination of sows by a single person.

The general purpose of the present invention, which will be described subsequently in greater detail, is to provide a new remote controlled boar guidance system and method of artificially inseminating sows apparatus and method which has many of the advantages of the remote controlled moving devices mentioned heretofore and many novel features that result in a new remote controlled boar guidance system and method of artificially inseminating sows which is not anticipated, rendered obvious, suggested, or even implied by any of the prior art remote controlled moving devices, either alone or in any combination thereof.

To attain this, the present invention generally comprises a remote controlled steerable vehicle having sufficient power to move a boar within confined spaces inside a swine insemination facility. The vehicle includes a plurality of wheels distributed on opposite sides of the vehicle. Wheels on each side are separately powered to permit steering of the device. The power source, drive motors, and receiver are positioned within a housing. In an embodiment, an opaque protection screen is provided to permit safe release of the boar from the device.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new remote controlled boar guidance system and method of artificially inseminating sows apparatus and method which has many of the advantages of the remote controlled moving devices mentioned heretofore and many novel features that result in a new remote controlled boar guidance system and method of artificially inseminating sows which is not anticipated, rendered obvious, suggested, or even implied by any of the prior art remote controlled moving devices, either alone or in any combination thereof.

It is another object of the present invention to provide a new remote controlled boar guidance system and method of artificially inseminating sows that may be easily and efficiently manufactured and marketed.

It is a further object of the present invention to provide a new remote controlled boar guidance system and method of artificially inseminating sows that is of a durable and reliable construction.

An even further object of the present invention is to provide a new remote controlled boar guidance system and method of artificially inseminating sows which is susceptible of a low cost of manufacture with regard to both materials and labor, and which accordingly is then susceptible of low prices of sale to the consuming public, thereby making such remote controlled boar guidance system and method of artificially inseminating sows economically available to the buying public.

Still yet another object of the present invention is to provide a new remote controlled boar guidance system and method of artificially inseminating sows which provides in the apparatuses and methods of the prior art some of the advantages thereof, while simultaneously overcoming some of the disadvantages normally associated therewith.

Still another object of the present invention is to provide a new remote controlled boar guidance system and method of artificially inseminating sows for facilitating movement of a boar inside a swine insemination facility to permit safe and efficient insemination of sows by a single person.

Yet another object of the present invention is to provide a new remote controlled boar guidance system and method of artificially inseminating sows which includes a remote controlled steerable vehicle having sufficient power to move a boar within confined spaces inside a swine insemination facility. The vehicle includes a plurality of wheels distributed on opposite sides of the vehicle. Wheels on each side are separately powered to permit steering of the device. The power source, drive motors, and receiver are positioned within a housing. In an embodiment, an opaque protection screen is provided to permit safe release of the boar from the device.

Still yet another object of the present invention is to provide a new remote controlled boar guidance system and method of artificially inseminating sows that is powerful enough to move an adult boar safely without having to position a person in close proximity to the boar while the boar is moving.

Even still another object of the present invention is to provide a new remote controlled boar guidance system and method of artificially inseminating sows that easily maneuverable within confined spaces.

Yet still another object of the present invention is to provide a durable device that is sufficiently weighted to prevent a boar from toppling the device.

Even yet another object of the present invention is to provide a method for inseminating sows that utilizes a remote controlled device for moving a boar into the view of sows being artificially inseminated.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side perspective view of a new remote controlled boar guidance system and method of artificially inseminating sows according to the present invention.

FIG. 2 is a front perspective view of the present invention.

DESCRIPTION Of THE PREFERRED EMBODIMENT

Figure 3:
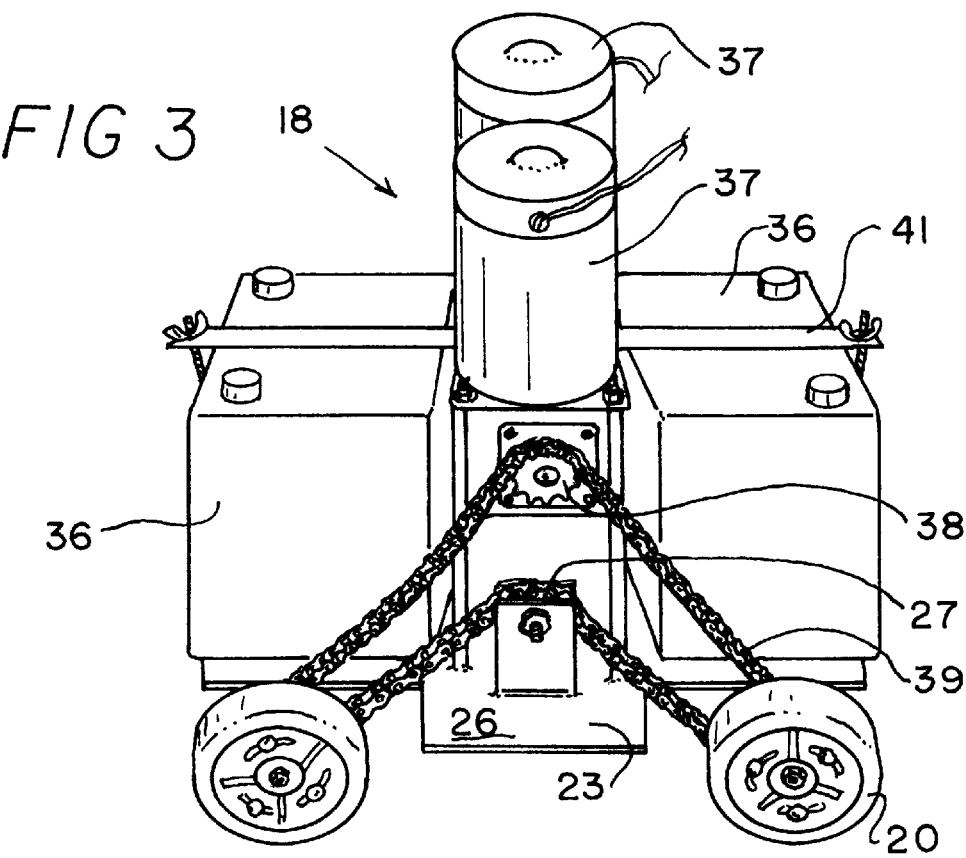
FIG. 3 is a side perspective view of the drive system of the present invention.
Figure 4:
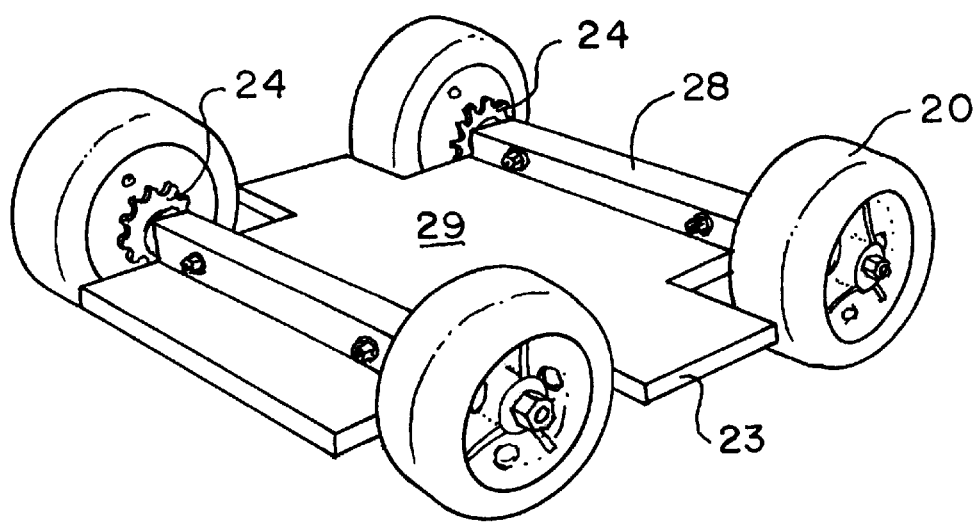
FIG. 4 is a bottom perspective view of the base of the present invention.
Figure 5:
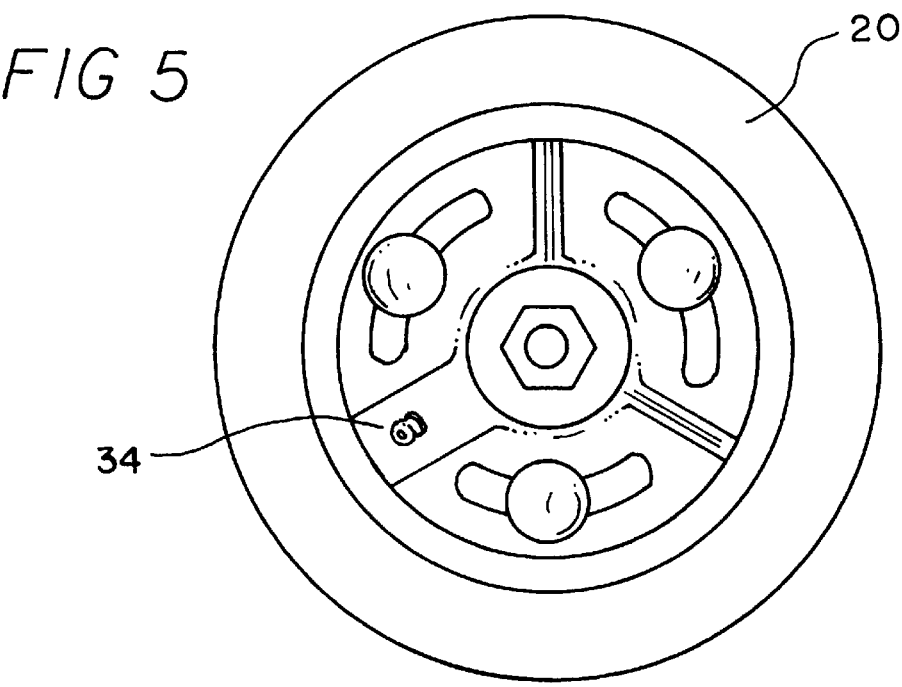
FIG. 5 is a front view of one of the wheels of the present invention.
Figure 6:
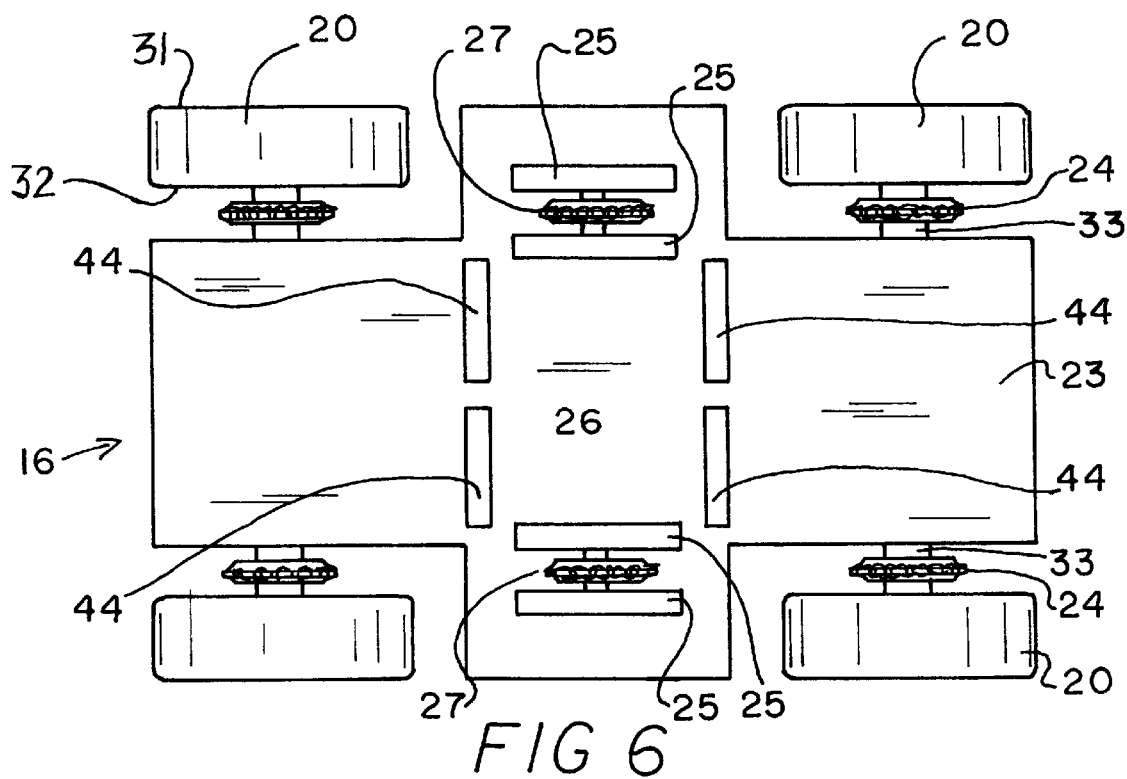
FIG. 6 is a top view to the support base assembly of the present invention.

With reference now to the drawings, and in particular to FIGS. 1 through 6 thereof, a new remote controlled boar guidance system and method of artificially inseminating sows embodying the principles and concepts of the present invention and generally designated by the reference numeral 10 will be described.

As best illustrated in FIGS. 1 through 6, the remote controlled boar guidance system and method of artificially inseminating sows 10 generally comprises a remotely steerable vehicle 12. The vehicle includes an attachment assembly 14, a support base assembly 16, and a drive system 18. The attachment assembly is designed for coupling a boar 2 to the vehicle. The support base assembly includes a plurality of wheels 20, and the drive system is coupled to the support base assembly.

A receiver 21 is operationally coupled to the drive system for moving the vehicle corresponding to an operational signal sent by a remote transmitter 22. Typically, the transmitter will include mechanism for steering the vehicle such as are commonly found in remote controlled vehicles known in the art. Testing has shown that a transmitter of the type disclosed in U.S. Pat. No. 5,508,479 is highly suited to the purpose disclosed because of durability and reliability.

The support base assembly includes a substantially planar base plate 23, the wheels 20, and a plurality of sprockets 24. Each sprocket is coupled to an associated one of the wheels that are coupled to the base plate. Each of the sprockets is operationally coupled to the drive system to provide four wheel drive capability.

Two pairs of sprocket support plates 25 are coupled to an upper surface 26 of the base plate. Each pair of sprocket support plates is positioned to extend orthogonally from the upper surface of the base plate in spaced relationship to each other. Each pair of sprocket support plates includes an associated alignment sprocket 27 rotationally coupled between the pair of sprocket support plates.

A pair of wheel attachment members 28 are coupled to a bottom surface 29 of the base plate. The wheel attachment members are positioned substantially parallel to each other to properly align the wheels. Each wheel includes an exterior side 31, an interior side 32, and an associated axle 33 extending from the interior side of the wheel. The axle is couplable to an associated end of one of the wheel attachment members whereby each wheel is permitted to rotate independently of the other wheels, thus permitting skid steer type steering for the vehicle.

Each wheel is an enclosed bearing type wheel for preventing debris and contaminants from contacting the bearings and hampering rotation of the wheel. Each wheel includes a grease nipple 34 for injecting grease into the wheel for facilitating rotation of the wheel.

The drive system includes a pair of batteries 36, a pair of motors 37, a pair of drive gears 38, and a pair of drive chains 39. The batteries are coupled to opposite ends of the support base assembly. As shown in the drawing figures, the batteries are secured by a clamping member 41. Each of the batteries is operationally coupled to a respective one of the motors to permit independent powering of each motor.

Each of the motors is operationally coupled to an associated one of the drive gears. The drive gears are coupled to the support base assembly in spaced relationship to the upper surface of the base plate. Each of the drive gears is operationally coupled to an associated one of the drive chains and each drive chain is operationally coupled to the sprockets of an associated pair of the wheels, which are coplanar with respect to each other. Each drive train is also operationally coupled to an associated alignment sprocket. The alignment sprockets are elevated relative to the sprockets of the associated coplanar pair of wheels to facilitate continued connection between the drive chain, the alignment sprocket, the sprockets 24 and the drive gear.

In use, each of the drive chains is operable independent of each other such that the vehicle is steerable by selectively actuating one of the drive chains such that one coplanar pair of wheels rotates at a different speed than the other coplanar pair of wheels.

A plurality of motor mounting plates 44 are coupled to and extend orthogonally outward from the upper surface of the base plate. The motors and drive gears are coupled to the motor mounting plates.

A casing 45 is coupled to the support base assembly for enclosing the drive system. A shield member 46 is coupled to the casing and extends upwardly from an upper surface 47 of the casing. The shield member is designed to extend above a head of the boar when the boar is coupled to the vehicle such that the boar is prevented from moving over the vehicle.

The attachment assembly includes a cutout 48 extending through the shield member. The cutout includes a broad portion 49 designed for permitting a knotted tether line 4 to pass through the broad portion. A slot 50 extends away from the broad portion. The slot is designed for receiving the tether line therein such that a knot in the knotted tether line is prevented from passing through the slot. Thus the knotted tether line is couplable to the shield member.

The attachment assembly also includes an alignment eye 52 coupled to the casing. The alignment eye is designed for receiving the knotted tether line therethrough and is positioned proximate a lowermost edge 54 of the casing. Thus, the alignment eye is designed to hold a medial portion of the tether line below a harness 6 coupled to the boar when the knotted tether line is coupled to the cutout.

An antenna 58 is operationally coupled to the receiver and extends upwardly from the upper surface of the casing. The antenna is positioned on a side of the casing opposite the alignment eye whereby the shield member is designed for being positioned between the boar and the antenna to prevent the boar from damaging the antenna.

In an embodiment, the casing also includes a slanted portion 60 extending between the upper surface of the casing and a side 61 of the casing. The slanted portion is designed such that a snout 3 of the boar is positioned above the slanted portion when the boar is coupled to the vehicle for comfortably holding the boar in close proximity to the vehicle. The shield member is further positioned proximate a top edge 66 of the slanted portion such that the casing and shield member are positioned such that the snout of the boar is urged upwardly by the slanted portion and the shield member when the vehicle is moved towards the boar. This design facilitates moving of the boar in a reverse direction because the head of the boar is forced into a raised position, which makes the boar easier to lead or move in the reverse direction.

Additional aspects of the invention include an on-board recharger incorporated into the drive system to prevent loss of battery power when not in use and a belt holster for the transmitter.

In an embodiment, two 12 volt batteries are used, two 12 volt motors are used, and the drive system is geared to move the vehicle at 1.6 feet per second to correspond to a slow walking pace for most animals. The above combination has been found to provide a powerful vehicle capable of moving heavy boars. In an embodiment, the vehicle is weighted to over about 370 pounds to prevent an animal from toppling the vehicle and to provide excellent animal movement capabilities.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of artificially inseminating swine, the steps of the method comprising:

providing a remote controlled device for moving a boar;

coupling a boar to said remote controlled device;

transmitting a signal to said remote controlled device to move said device and said boar through a swine insemination facility such that said boar is visible to a sow to be artificially inseminated; and artificially inseminating said sow while said boar is viewable by said sow.

2. A remote controlled boar guidance system for guiding a boar through a swine insemination facility such that said boar is visible to a sow being artificially inseminated, the system comprising:

a steerable vehicle having an attachment assembly, a support base assembly, and a drive system, the attachment assembly being adapted for coupling the boar to said vehicle, the support base assembly having a plurality of wheels, and the drive system being coupled to the support base assembly; and a receiver operationally coupled to the drive system for moving said vehicle corresponding to an operational signal sent by a remote transmitter.

3. The boar guidance system of claim 2, further comprising:

said support base assembly having a substantially planar base plate, a plurality of wheels coupled to said base plate, and a plurality of sprockets, each sprocket being coupled to an associated one of said wheels, each of said sprockets being operationally coupled to said drive system.

4. The boar guidance system of claim 3, further comprising:

two pairs of sprocket support plates coupled to an upper surface of said base plate, each pair of sprocket support plates being positioned to extend orthogonally from said upper surface of said base plate in spaced relationship to each other;

each pair of sprocket support plates having an associated alignment sprocket rotationally coupled between said pair of sprocket support plates.

5. The boar guidance system of claim 3, further comprising:

a pair of wheel attachment members coupled to a bottom surface of said base plate, said wheel attachment members being positioned substantially parallel to each other;

each wheel having an exterior side and an interior side;

each wheel having an associated axle extending from said interior side of said wheel, said axle being couplable to an associated end of one of said wheel attachment assemblies whereby each wheel is permitted to rotate independently of the other wheels.

6. The boar guidance system of claim 3, further comprising:

each wheel being an enclosed bearing wheel for preventing debris from hampering rotation of said wheel; and each wheel including a grease nipple for injecting grease into said wheel for facilitating rotation of said wheel.

7. The boar guidance system of claim 3, further comprising:

said drive system having a pair of batteries, a pair of motors, a pair of drive gears, and a pair of drive chains;

said batteries being coupled to opposite ends of said support base assembly, each of said batteries being operationally coupled to a respective one of said motors;

each of said motors being operationally coupled to an associated one of said drive gears, said drive gears being coupled to said support base assembly in spaced relationship to an upper surface of said base plate;

each of said drive gears being operationally coupled to an associated one of said drive chains; and each drive chain being operationally coupled to said sprockets of an associated pair of said wheels, said associated pair of wheels being substantially coplanar with respect to each other.

8. The boar guidance system of claim 7, further comprising:

a plurality of motor mounting plates coupled to and extending orthogonally outward from said upper surface of said base plate, said motors and drive gears being coupled to said motor mounting plates.

9. The boar guidance system of claim 3, further comprising:

said wheels being divided into two pairs of wheels, each pair of wheels being substantially coplanar with respect to each other;

wherein said drive system includes a pair of drive chains, each drive train being operationally coupled to the sprockets of an associated coplanar pair of said wheels; and each of said drive chains being operable independent of each other such that said vehicle is steerable by selectively actuating one of said drive chains whereby one coplanar pair of wheels rotates at a different speed than the other coplanar pair of wheels.

10. The boar guidance system of claim 2, further comprising:

a casing having an upper surface, the casing being coupled to said support base assembly for enclosing said drive system.

11. The boar guidance system of claim 10, further comprising:

a shield member coupled to said casing, said shield member extending upwardly from the upper surface of said casing, said shield member being adapted to extend above a head of the boar when the boar is coupled to the vehicle such that the boar is prevented from moving over the vehicle.

12. The boar guidance system of claim 11, further comprising:

said attachment assembly including a cutout extending through said shield member, said cutout including a broad portion for receiving a knotted tether line through the broad portion and a slot extending away from the broad portion, the slot being adapted for receiving the tether line therein, said slot being adapted such that a knot in said knotted tether line is prevented from passing through said slot whereby said knotted tether line is couplable to said shield member.

13. The boar guidance system of claim 12, further comprising:

said attachment assembly having an alignment eye coupled to said casing, said alignment eye being adapted for receiving the knotted tether line therethrough, said alignment eye being positioned proximate a lowermost edge of said casing such that said alignment eye is adapted to hold a medial portion of said tether line below a harness coupled to the boar when the knotted tether line is coupled to the cutout.

14. The boar guidance system of claim 13, further comprising:

an antenna coupled to the upper surface of the casing, said antenna being positioned on a side of the casing opposite the alignment eye whereby said shield member is adapted for being positioned between the boar and the antenna.

15. The boar guidance system of claim 11, wherein said shield member is positioned proximate a top edge of said slanted portion such that said casing and shield member are adapted such that the snout of the boar is urged upwardly by said slanted portion and said shield member when said vehicle is moved towards the boar for facilitating moving of the boar in a reverse direction.

16. The boar guidance system of claim 10, further comprising:

said casing having a slanted portion extending between the upper surface of the casing and a side of the casing, the slanted portion being adapted such that a snout of the boar is positioned above said slanted portion when the boar is coupled to the vehicle for comfortably holding the boar in close proximity to the vehicle.

17. A remote controlled boar guidance system for guiding a boar through a swine insemination facility such that said boar is visible to a sow being artificially inseminated, the system comprising:

a steerable vehicle having an attachment assembly, a support base assembly, and a drive system, the attachment assembly being adapted for coupling the boar to said vehicle, the support base assembly having a plurality of wheels, and the drive system being coupled to the support base assembly;

a receiver operationally coupled to the drive system for moving said vehicle corresponding to an operational signal sent by a remote transmitter;

said support base assembly having a substantially planar base plate, said plurality of wheels being coupled to said base plate, and a plurality of sprockets, each sprocket being coupled to an associated one of said wheels, each of said sprockets being operationally coupled to said drive system;

two pairs of sprocket support plates coupled to an upper surface of said base plate, each pair of sprocket support plates being positioned to extend orthogonally from said upper surface of said base plate in spaced relationship to each other;

each pair of sprocket support plates having an associated alignment sprocket rotationally coupled between said pair of sprocket support plates;

a pair of wheel attachment members coupled to a bottom surface of said base plate, said wheel attachment members being positioned substantially parallel to each other;

each wheel having an exterior side and an interior side;

each wheel having an associated axle extending from said interior side of said wheel, said axle being couplable to an associated end of one of said wheel attachment assemblies whereby each wheel is permitted to rotate independently of the other wheels;

each wheel being an enclosed bearing wheel for preventing debris from hampering rotation of said wheel;

each wheel including a grease nipple for injecting grease into said wheel for facilitating rotation of said wheel;

said drive system having a pair of batteries, a pair of motors, a pair of drive gears, and a pair of drive chains;

said batteries being coupled to opposite ends of said support base assembly, each of said batteries being operationally coupled to a respective one of said motors;

each of said motors being operationally coupled to an associated one of said drive gears, said drive gears being coupled to said support base assembly in spaced relationship to an upper surface of said base plate;

each of said drive gears being operationally coupled to an associated one of said drive chains;

said wheels being divided into two pairs of wheels, each pair of wheels being substantially coplanar with respect to each other;

wherein said drive system includes a pair of drive chains, each drive train being operationally coupled to the sprockets of an associated coplanar pair of said wheels;

each of said drive chains being operable independent of each other such that said vehicle is steerable by selectively actuating one of said drive chains whereby one coplanar pair of wheels rotates at a different speed than the other coplanar pair of wheels;

a plurality of motor mounting plates coupled to and extending orthogonally outward from said upper surface of said base plate, said motors and drive gears being coupled to said motor mounting plates;

a casing having an upper surface, the casing being coupled to said support base assembly for enclosing said drive system;

a shield member coupled to said casing, said shield member extending upwardly from the upper surface of said casing, said shield member being adapted to extend above a head of the boar when the boar is coupled to the vehicle such that the boar is prevented from moving over the vehicle;

said attachment assembly including a cutout extending through said shield member, said cutout including a broad portion for receiving a knotted tether line through the broad portion and a slot extending away from the broad portion, the slot being adapted for receiving the tether line therein, said slot being adapted such that a knot in said knotted tether line is prevented from passing through said slot whereby said knotted tether line is couplable to said shield member;

said attachment assembly having an alignment eye coupled to said casing, said alignment eye being adapted for receiving the knotted tether line therethrough, said alignment eye being positioned proximate a lowermost edge of said casing such that said alignment eye is adapted to hold a medial portion of said tether line below a harness coupled to the boar when the knotted tether line is coupled to the cutout;

an antenna coupled to the upper surface of the casing, said antenna being positioned on a side of the casing opposite the alignment eye whereby said shield member is adapted for being positioned between the boar and the antenna;

said casing having a slanted portion extending between the upper surface of the casing and a side of the casing, the slanted portion being adapted such that a snout of the boar is positioned above said slanted portion when the boar is coupled to the vehicle for comfortably holding the boar in close proximity to the vehicle; and wherein said shield member is positioned proximate a top edge of said slanted portion such that said casing and shield member are adapted such that the snout of the boar is urged upwardly by said slanted portion and said shield member when said vehicle is moved towards the boar for facilitating moving of the boar in a reverse direction.

* * * * *